United States Patent
Hattori

(10) Patent No.: US 11,702,502 B2
(45) Date of Patent: Jul. 18, 2023

(54) EPOXY RESIN COMPOSITION AND CURED PRODUCT

(71) Applicant: NIPPON STEEL CHEMICAL & MATERIAL CO., LTD., Tokyo (JP)

(72) Inventor: Koichi Hattori, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 17/639,404

(22) PCT Filed: Sep. 23, 2020

(86) PCT No.: PCT/JP2020/035659
§ 371 (c)(1),
(2) Date: Mar. 1, 2022

(87) PCT Pub. No.: WO2021/060226
PCT Pub. Date: Apr. 1, 2021

(65) Prior Publication Data
US 2022/0306798 A1    Sep. 29, 2022

(30) Foreign Application Priority Data

Sep. 27, 2019  (JP) ................. 2019-177384

(51) Int. Cl.
| | | |
|---|---|---|
| C08G 59/28 | (2006.01) |
| C08G 59/24 | (2006.01) |
| C08G 59/40 | (2006.01) |
| C08L 63/00 | (2006.01) |
| C08G 59/54 | (2006.01) |
| C09J 163/00 | (2006.01) |

(52) U.S. Cl.
CPC ............. C08G 59/28 (2013.01); C08G 59/54 (2013.01)

(58) Field of Classification Search
None
See application file for complete search history.

(56) References Cited

U.S. PATENT DOCUMENTS

| | | | |
|---|---|---|---|
| 2010/0035041 A1* | 2/2010 | Kramer | C09J 175/04 528/65 |
| 2017/0198085 A1 | 7/2017 | Yamada et al. | |
| 2021/0032400 A1 | 2/2021 | Hattori et al. | |
| 2021/0047458 A1 | 2/2021 | Yokoyama et al. | |

FOREIGN PATENT DOCUMENTS

| | | | | |
|---|---|---|---|---|
| JP | 05148337 A | * | 6/1993 | ............. C08G 18/58 |
| JP | 2007-224144 A | | 9/2007 | |
| JP | 2007246648 A | * | 9/2007 | ............. C08G 59/28 |
| JP | 2007-284467 A | | 11/2007 | |
| JP | 2007-284474 A | | 11/2007 | |
| JP | 2016-011409 A | | 1/2016 | |
| JP | 2017-082128 A | | 5/2017 | |
| JP | 2017-226717 A | | 12/2017 | |
| WO | 2019/188399 A1 | | 10/2019 | |
| WO | 2019/188400 A1 | | 10/2019 | |

OTHER PUBLICATIONS

Machine translation of JP-05148337-A (no date).*
Machine translation of JP-2007246648-A (no date).*

\* cited by examiner

*Primary Examiner* — Michael J Feely
(74) *Attorney, Agent, or Firm* — Locke Lord LLP

(57) ABSTRACT

Disclosed is a polyurethane-modified epoxy resin composition capable of satisfying both high toughness and high elasticity. This epoxy resin composition is an epoxy resin composition, in which (A) a polyurethane-modified epoxy resin having a polycarbonate structure in the molecule and having a urethane modification rate of 20 to 60% by weight, (B) a non-polyurethane-modified epoxy resin that is liquid at 30° C., (C) a solid epoxy resin having a glass transition temperature or melting point of 50° C. or higher and (D) an amine-based curing agent that is dicyandiamide or a derivative thereof are as essential components, and 20.0 to 50.0% by weight of (A), 0.1 to 50.0% by weight of (B) and 0.1 to 50.0% by weight of (C) are contained relative to the total of (A) to (D).

9 Claims, No Drawings

EPOXY RESIN COMPOSITION AND CURED PRODUCT

TECHNICAL FIELD

The present invention relates to a polyurethane-modified epoxy resin composition containing a non-polyurethane-modified epoxy resin for polyurethane concentration adjustment and a curing agent blended with a polyurethane-modified epoxy resin, and a cured product thereof.

BACKGROUND ART

Epoxy resins are used in a variety of applications such as electric insulating materials (casting molds, impregnation, laminated sheets and sealing materials), matrix resins for composite materials such as CFRP, structural adhesives and thick anticorrosion paint in a large amount, since the processability is excellent and diverse cured product can be provided which exhibits characteristics such as high heat resistance, high insulation reliability, high stiffness, high adhesion and high corrosion resistance.

On the other hand, since epoxy resin cured products have low elongation at break, low fracture toughness and low peel strength, in the applications of matrix resins for composite materials or the applications of structural adhesives requiring these characteristics, the above-described characteristics have been improved by a variety of modifications such as rubber modification and polyurethane modification.

Patent Literature 1 and Patent Literature 2 disclose epoxy resin compositions obtained by blending a specific epoxy resin such as polyoxyalkylene diglycidyl ether with a polyurethane-modified epoxy resin which is synthesized by blending polypropylene diol and isophorone diisocyanate in the presence of a bisphenol A-type epoxy resin, such that the mole ratio of NCO groups contained in the isophorone diisocyanate to total OH groups contained in the bisphenol A-type epoxy resin and the polypropylene diol be 1.0, which can be applied to structural adhesives for automobiles having high shear strength, high peel strength and high torsional shear strength and being excellent in terms of adhesion and impact resistance.

However, regarding the above-described polyurethane-modified epoxy resin, there is no description on how to control resin characteristics and cured product characteristics by regulating the feed concentration of the epoxy resin including a hydroxyl group. In addition, data on the viscosity of the composition and the elongation at break, fracture toughness and glass transition temperature of a cured product is also not disclosed.

Patent Literature 3 discloses that a resin composition containing a urethane-modified epoxy resin in which a specific diol compound and diphenylmethane diisocyanate are fed into and reacted with a bisphenol A-type epoxy resin to obtain a urethane prepolymer and then 1,4-butanediol as a chain extender is fed to produce a polyurethane which provides a cured product having a high fracture toughness value that is useful in electrical and electronic applications or building material applications.

However, similarly, there is no description on how to control resin characteristics and cured product characteristics by regulating the feed concentration of the epoxy resin including a hydroxyl group regarding the above-described urethane-modified epoxy resin. In addition, data on the viscosity of the composition or the elongation at break of the cured product is also not disclosed. There is a description of data on fracture toughness and glass transition temperature, and a significant improvement effect is admitted for the former characteristic; however, regarding the latter characteristic, the glass transition temperature is low for epoxy resin cured products and heat resistance is not sufficient.

In addition, the present inventors disclose a urethane-modified epoxy resin in Patent Literature 4, but the urethane-modified epoxy resin has a problem with impact resistance that is not sufficiently improved in a composition thereof with a certain type of curing agent.

Patent Literature 5 discloses that an adhesive having flexibility or toughness is developed by using a polycarbonate-modified epoxy resin. Here, effects such as flexible stress relaxation or toughness enhancement by elastic modulus reduction is described. However, no data regarding toughness is shown, other than strength and elongation.

In addition, in Patent Literature 6, application of polycarbonate diol to urethane-modified epoxy resins is studied, and an effect of reduction in fracture toughness owing to the use of polycarbonate diol is described, however, it is shown that high toughness cannot be obtained by using polycarbonate diol having a rigid structure compared with polytetramethylene glycol or polypropylene glycol.

CITATION LIST

Patent Literature

Patent Literature 1: JP2007-284467 A
Patent Literature 2: JP2007-284474 A
Patent Literature 3: JP2007-224144 A
Patent Literature 4: JP2016-11409 A
Patent Literature 5: JP2017-226717 A
Patent Literature 6: JP2017-82128 A

SUMMARY OF INVENTION

The present invention aims to provide a novel polyurethane-modified epoxy resin composition which enables to provide a cured product having a glass transition temperature of 110° C. or higher, an Izod impact strength value (JIS (JAPANESE INDUSTRIAL STANDARD) K 7110; unnotched) of 30 kJ/m$^2$ or more, an elastic modulus of 2.5 GPa or more and a fracture toughness of 2.0 MPa·m$^{0.5}$ or more in order to improve the fatigue resistance or peel strength, impact resistance and compressive strength of casting mold materials, composite materials and structural adhesives or retain the heat resistance of cured products, and a novel cured product.

The present invention is an epoxy resin composition containing the following components (A) to (D) as essential components;

(A) a polyurethane-modified epoxy resin having a polycarbonate structure in a molecule and having a urethane modification rate of 20 to 60% by weight, (B) a non-polyurethane-modified epoxy resin that is liquid at 30° C., (C) a bisphenol-type solid epoxy resin having a glass transition temperature or melting point of 50° C. or higher, and (D) an amine-based curing agent that is dicyandiamide or a derivative thereof, in which 20.0 to 50.0% by weight of component (A), 0.1 to 50.0% by weight of component (B) and 0.1 to 50.0% by weight of component (C) are contained relative to a total of components (A) to (D).

The polycarbonate structure of component (A) may include a structural unit represented by a general formula (1).

[Chem. 1]

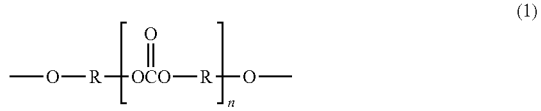

(1)

wherein each R is independently an alkylene group having 1 to 20 carbon atoms, and n is a number of 1 to 50.

In addition, the polyurethane-modified epoxy resin may have a weight-average molecular weight (Mw) of 10,000 or more and 50,000 or less.

Component (A) is preferably a polyurethane-modified epoxy resin obtained by modifying a bisphenol-based epoxy resin (a) represented by the following formula (2) and having an epoxy equivalent of 150 to 200 g/eq and a hydroxyl equivalent of 2000 to 3000 g/eq with a medium and high molecular weight polyol compound (b), a polycarbonate diol compound (b–2), a polyisocyanate compound (c) and a low molecular weight polyol compound (d) having a number-average molecular weight of less than 200 as a chain extender. Preferably, component (A) is a polyurethane-modified epoxy resin obtained by reacting epoxy resin (a) with components (b), (b–2) and (c), using 50 to 80% by weight of epoxy resin (a) relative to the total amount of components (a), (b), (b–2), (c) and (d), and 20 to 55% by weight of polycarbonate diol (b–2) relative to the total amount of components (b) and (b–2), to generate a urethane prepolymer (P) and then adding low molecular weight polyol compound (d) such that the mole ratio between an NCO group in urethane prepolymer (P) and an OH group in low molecular weight polyol compound (d) falls within a range of 0.9:1 to 1:0.9 to perform through polyurethanization reaction.

In addition, as a production method therefor, it is desirable to react components (a), (b), (b–2) and (c) and then react component (d).

sition temperature, and thus a resin composition and cured product thereof become suitable for matrix resins and the like for adhesives, coating materials, electrical and electronic materials and composite materials.

DESCRIPTION OF EMBODIMENTS

An epoxy resin composition of the present invention contains (A) a polyurethane-modified epoxy resin having a polycarbonate structure in the molecule and having a urethane modification rate of 20 to 60% by weight, (B) a non-polyurethane-modified epoxy resin that is liquid at 30° C., (C) a solid epoxy resin having a glass transition temperature or melting point of 50° C. or higher and (D) dicyandiamide or an amine-based curing agent that is a derivative of dicyandiamide as essential components. These components will also be referred to as the polyurethane-modified epoxy resin, the liquid epoxy resin, the solid epoxy resin and the amine-based curing agent or component (A), component (B), component (C) and component (D), respectively. Hereinafter, each component will be described.

In the epoxy resin composition of the present invention, component (A) is preferably a polyurethane-modified epoxy resin having a polycarbonate structure in the molecule and a concentration by weight of polyurethane constituent components of 20.0 to 60.0% by weight.

The polyurethane-modified epoxy resin can be produced by reacting an epoxy resin (a), a medium and high molecular weight polyol compound (b), a polycarbonate diol compound (b–2), a polyisocyanate compound (c) and a low molecular weight polyol compound (d). Here, epoxy resin (a), the medium and high molecular weight polyol compound (b), polycarbonate diol compound (b–2), polyisocyanate compound (c), and low molecular weight polyol compound (d) are also referred to as components (a), (b), (b–2), (c) and (d), respectively.

The polyurethane constituent components are components excluding epoxy resin (a) as a raw material, that is, polyol compound (b), polycarbonate diol compound (b–2), polyisocyanate compound (c) and low molecular weight polyol compound (d), and the urethane modification rate

[Chem. 2]

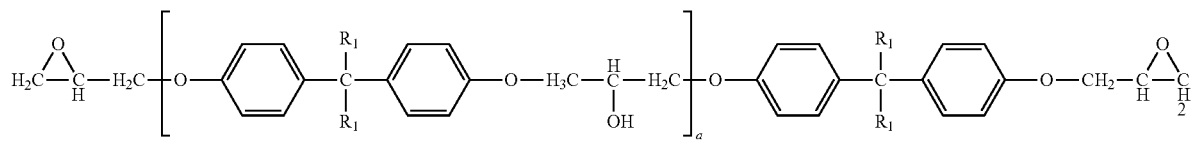

(2)

wherein each $R_1$ is independently H or an alkyl group, and a is a number of 0 to 10.

In addition, the present invention is an epoxy resin cured product obtained by curing the epoxy resin composition.

This epoxy resin cured product preferably has a glass transition temperature of 110° C. or higher, an Izod impact strength value of 30 kJ/m² or more, an elastic modulus of 2.5 GPa or more and a fracture toughness of 2.0 MPa·m$^{0.5}$ or more.

The epoxy resin composition of the present invention is capable of improving the strength, fracture toughness and impact strength of a cured product altogether and, furthermore, capable of suppressing a decrease in the glass tranrefers to the ratio of the total of these polyurethane constituent components to the weight of the entire polyurethane-modified epoxy resin.

Components (b), (b–2) and (d) are all polyol-based compounds, where component (b) has a number-average molecular weight of 200 or more, and adversely component (d) has a number-average molecular weight of less than 200. In addition, a compound corresponding to component (b–2) is regarded as a compound of component (b–2) and is not regarded as a compound of component (b) or (d) even in the case where component (b–2) also satisfies the requirement of component (b) or (d).

The polycarbonate diol compound (b-2) may be a medium and high molecular weight polyol compound, and specifically including this structure enables to exhibit the effect of the present invention.

As polycarbonate diol compound (b-2), a compound having an aromatic structure, an aliphatic structure, an alicyclic structure or the like can be used as long as the compound is a diol compound having a carbonate bond in the molecule, for example, a compound obtained by conducting an esterification reaction between a carbonic acid derivative and an aliphatic polyol or the like can be used. Specific examples thereof include products obtained by reacting a diol such as ethylene glycol, 1,2-propanediol, 1,3-propanediol, 1,4-butanediol, 1,6-hexanediol, diethylene glycol, polyethylene glycol, polypropylene glycol or polytetramethylene glycol (PTMG) with dimethyl carbonate, diphenyl carbonate, phosgene or the like. These may be used singly or two or more thereof may be used in combination. Examples of commercially available products thereof include UH-100, UH-200 and UH-300 manufactured by Ube Industries, Ltd., T5650J, T5651, T5652, G3452, T4691, T4692, G4672 and T4671 manufactured by Asahi Kasei Corporation and the like.

Polycarbonate diol compound (b-2) is preferably an aliphatic polycarbonate diol compound represented by the following formula (3).

[Chem. 3]

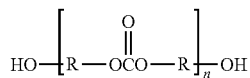

(3)

wherein each R is independently an alkylene group having 1 to 20 carbon atoms, and n is a number of 1 to 50.

The structure of formula (1) can be introduced into a polyurethane-modified epoxy resin by using the abovementioned compound. The physical properties of the polyurethane-modified epoxy resin or composition to be produced depends on the same of the abovementioned compound such as molecular weight, crystallinity, polarity, structure. The number-average molecular amount of polycarbonate diol compound (b-2) is particularly preferably approximately 800 to 3000, on the basis of properties such as flexibility and compatibility with other resins.

As the medium and high molecular weight polyol compound (b), a polyol compound that has a number-average molecular weight of 200 or more which does not satisfy the requirement of polycarbonate diol compound (b-2) is used. An OH group may be a secondary hydroxyl group, while the reactivity is excellent when the OH group is a primary hydroxyl group.

The medium and high molecular weight polyol compound (b) is preferably a compound represented by any of the following formulae (4) to (11), and these compounds can be used singly or two or more in a mixed state.

[Chem. 4]

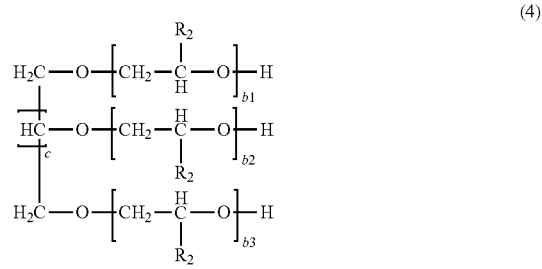

(4)

wherein $R_2$ is H or a methyl group, b1, b2 and b3 are independently a number of 1 to 50, and c is a number of 0 or 1.

[Chem. 5]

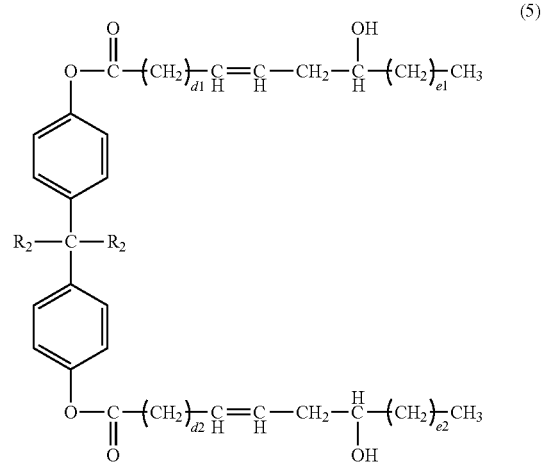

(5)

wherein $R_2$ is H or a methyl group, and d1, d2, e1 and e2 are independently a number of 1 to 20.)

[Chem. 6]

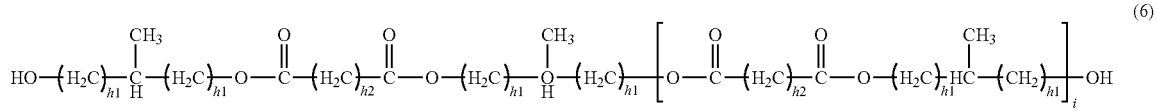

(6)

wherein h1 and h2 are independently a number of 1 to 20, and i is a number of 1 to 50.

[Chem. 7]

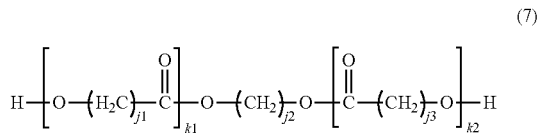
(7)

wherein j1, j2 and j3 are independently a number of 1 to 20, and k1 and k2 are independently a number of 1 to 50.

[Chem. 8]

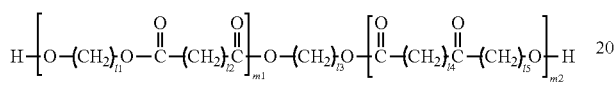
(8)

wherein l1, l2, l3, l4 and l5 are independently a number of 1 to 20, and m1 and m2 are independently a number of 1 to 50.

[Chem. 9]

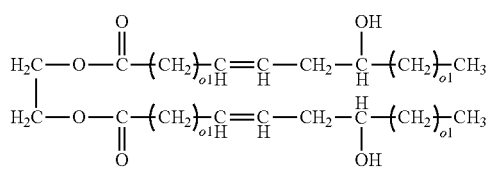
(9)

wherein o1, o2, o3 and o4 are independently a number of 1 to 20.

[Chem. 10]

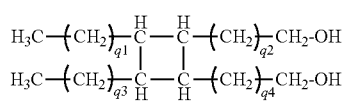
(10)

wherein q1, q2, q3 and q4 are independently a number of 1 to 20.

[Chem. 11]

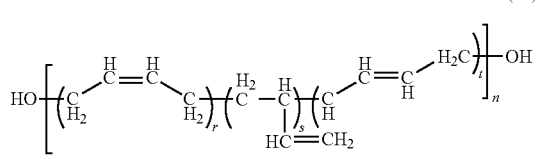
(11)

wherein r, s and t are independently a number of 1 to 20, and n is a number of 1 to 50.

The medium and high molecular weight polyol compound (b) preferably has a number-average molecular weight of 200 or more, has a molecular structure of any of the formulae (4) to (12) and has excellent compatibility with epoxy resin (a). For example, polyethylene glycols or polypropylene glycols obtained by ring-opening polyaddition of ethylene oxide or propylene oxide with a polyvalent alcohol such as ethylene glycol or glycerol can be exemplified, while polypropylene glycol represented by formula (13), wherein c is 0 in formula (4) and $R_2$ is a methyl group, is preferred from the viewpoint of availability and a favorable balance between price and characteristics. In addition, the number of OH groups in polyol compound (b) is at least two or more and preferably two.

[Chem. 12]

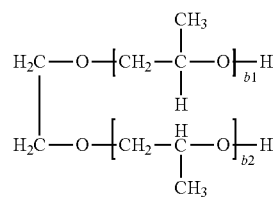
(13)

wherein b1 and b2 are independently a number of 1 to 50.

The polypropylene glycol is preferably polypropylene glycol having a number-average molecular weight of 1500 to 5000, preferably 2000 to 3000, from the viewpoint of supporting favorable tackiness, followability to adhesion surfaces, castability and favorable impregnating ability into carbon fibers or glass fibers of this composition without thickening or semi-solidifying the polyurethane-modified epoxy resin composition.

Epoxy resin (a) is preferably liquid at normal temperature and preferably has an epoxy equivalent of 200 g/eq or less from such a viewpoint. The epoxy resin preferably has an epoxy equivalent of 150 to 200 g/eq and a hydroxyl equivalent of 2000 to 3000 g/eq. More preferably, the epoxy resin is preferably a secondary hydroxyl group-containing bisphenol-based epoxy resin that is represented by formula (2) and has an epoxy equivalent of 150 to 200 g/eq and a hydroxyl equivalent of 2000 to 2600 g/eq.

In the formula, each $R_1$ is independently H or an alkyl group, and a is a number of 0 to 10. In the case of an alkyl group, the number of carbon atoms is preferably within a range of 1 to 3 and more preferably 1.

A particularly preferred epoxy resin (a) is a bisphenol A-type epoxy resin represented by a formula (14) or a bisphenol F-type epoxy resin represented by a formula (15).

In the formula, a1 or a2 is a number of 0 to 10, and, when the epoxy resin has a certain molecular weight distribution, the average value (number-average value) preferably satisfies the above-described range. The a1 or a2 is determined so as to satisfy the above-described epoxy equivalent and the hydroxyl equivalent.

(14)

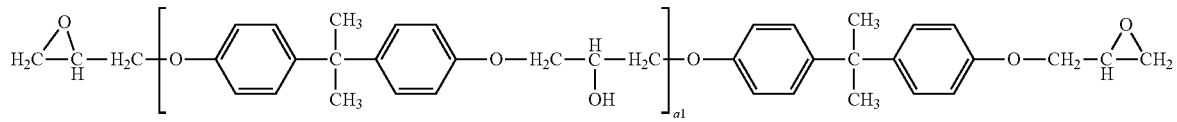

(15)

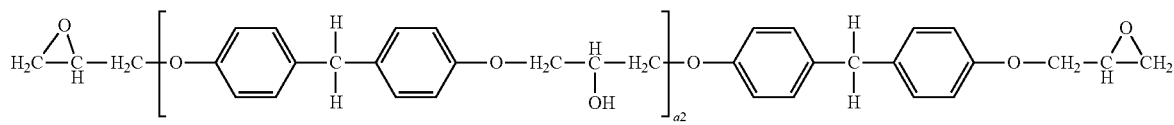

Polyisocyanate compound (c) is preferably represented by formula (16) in which $R_4$ is a divalent group selected from formulae (16a) to (16f). Among these, a polyisocyanate compound having excellent compatibility with epoxy resin (a) is preferred.

Specific examples thereof include toluene diisocyanate (TDI), 4,4'-diphenylmethane diisocyanate (MDI), xylylene diisocyanate (XDI), hydrogenated xylylene diisocyanate (HXDI), isophorone diisocyanate (IPDI), naphthalene diisocyanate and the like, and MDI represented by a formula (17) is preferred from the viewpoint of a low molecular weight, free from thickening property, a low price, safety and the like. The number of NCO groups in polyisocyanate compound (c) needs to be two or more and is preferably two.

[Chem. 14]

$$OCN-R_4-NCO \qquad (16)$$

(Here, $R_4$ is a divalent group selected from formulae 16a to 16f.)

[Chem. 15]

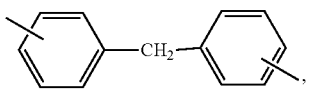 (16a)

 (16b)

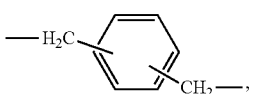 (16c)

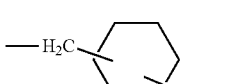 (16d)

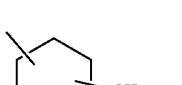 (16e)

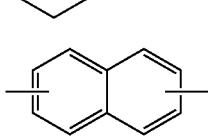 (16f)

[Chem. 16]

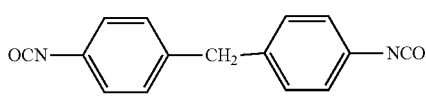 (17)

Low molecular weight polyol compound (d) is a polyol compound having a number-average molecular weight of less than 200. This is used as a chain extender. A diol compound having two primary hydroxyl groups represented by a formula (18) is preferred.

[Chem. 17]

$$HO-R_5-OH \qquad (18)$$

$$-(CH_2)_g- \qquad (18a)$$

wherein $R_5$ is an alkylene group represented by the formula 18a, and g is a number of 1 to 10.)

Specific examples of low molecular weight polyol compound (d) include polyvalent alcohols such as 1,4-butanediol and 1,6-pentanediol and the like. Among these, 1,4-butanediol is more preferred from the viewpoint of availability and a favorable balance between price and characteristics.

Next, the polyurethane-modified epoxy resin in which the individual components (a), (b), (b–2), (c) and (d) are used is described in the following reaction mechanisms. Each component can be used singly or two or more in a mixed state.

The OH group contained in epoxy resin (a) is mainly a secondary OH group included in an epoxy resin having a degree of polymerization of 1 (which is a component for which n in formula (2) is 1 and thus referred to as the n=1 structure). This is also the case where an epoxy resin having a degree of polymerization of 2 or more (referred to as the n>1 structure) is contained, where a secondary OH group is included. Hereinafter, the n=1 structure and the n>1 structure will be collectively referred to as the n≥1 structure.

On the other hand, in a case where the OH groups in polyol compound (b) and polycarbonate diol compound (b–2) are primary OH groups, when epoxy resin (a), polyol compound (b), polycarbonate diol compound (b–2) and polyisocyanate compound (c) are fed and reacted, the primary OH groups in these compounds and the NCO groups in polyisocyanate compound (c) preferentially react with one another.

Typically, it is considered that the primary OH groups in polyol compound (b) and polycarbonate diol compound (b-2) preferentially react with the NCO groups in polyisocyanate compound (c) and thereby generate a NCO group-terminated urethane prepolymer (P1), subsequently, the secondary OH groups in the n 1 structure in epoxy resin (a) react with some of terminal NCO groups in the prepolymer to form urethane bonds, in order to provide a urethane prepolymer (P2) in which the n 1 structure in epoxy resin (a) has been added to both terminals or a single terminal of the urethane prepolymer.

That is, a urethane prepolymer (P) is considered as a mixture of the NCO group-terminated urethane prepolymer (P1) and the urethane prepolymer (P2) in which the n 1 structure in epoxy resin (a) has been added to both terminals or a single terminal of P1; however, since the mole ratio of the NCO groups is large and the epoxy resin is also excessively used, it is considered that the urethane prepolymer (P2) in which the epoxy resin has been added to both terminals is mainly generated.

In the case where an amount of epoxy resin (a) to be charged is increased, both terminals or a single terminal is capped with the n 1 structure in epoxy resin (a) and the terminal NCO groups are consumed, so that the amount of the urethane prepolymer (P2) which does not react with low molecular weight polyol compound (d) as a chain extender increases, while the proportion of the urethane prepolymer (P1) in which the terminals are the NCO groups as an initial form decreases, to less provide a polyurethane generated by a reaction between the terminal NCO groups in P1 and the OH groups in low molecular weight polyol compound (d) which is a chain extender. Accordingly, the molecular weight distribution of the polyurethane-modified epoxy resin is also considered to shift toward the low molecular weight side.

Conversely, in the case where an amount of epoxy resin (a) to be charged is decreased, the amount of the urethan prepolymer (P2) in which both terminals or a single terminal is capped with the n 1 structure in epoxy resin (a) decreases, while the proportion of the initial urethane prepolymer (P1) in which the terminals are remained as NCO groups increases. Therefore, the amount of a polyurethane generated by a reaction between the terminal NCO groups in P1 and the OH groups in low molecular weight polyol compound (d) which is a chain extender increases. Accordingly, the molecular weight distribution of the polyurethane-modified epoxy resin is also considered to shift toward the high molecular weight side.

Epoxy resin (a) is often a mixture of a monomer having repetitions (n) of 0 and a multimer having repetitions of one or more; however, in a case where epoxy resin (a) is a multimer, epoxy resin (a) has a secondary OH group that is generated by the ring-opening of an epoxy group. Since this OH group is reactive with the NCO groups in polyisocyanate compound (c) or the NCO groups at the terminals of urethane prepolymer (P), the n≥1 structure in epoxy resin (a) reacts with this OH group. An n=0 structure having no OH groups is not involved in this reaction.

When polyol compound (b), polycarbonate diol compound (b-2) and polyisocyanate compound (c) are all difunctional, the mole ratio between OH groups and the NCO groups corresponds with the ratio between the number of moles of polyol compound (b) and polycarbonate diol compound (b-2) and the number of moles of polyisocyanate compound (c).

The mole ratio (NCO group/OH group) is preferably 1.5 to 6. In a case where components (b), (b-2) and (c) are difunctional, the mole ratio of these to be fed or (c)/[(b)+(b-2)] is preferably 1.5 to 6.

When the mole ratio is increased, that is, polyisocyanate compound (c) is set to be excessive, it is possible to obtain much more amount of an urethan prepolymer having isocyanate groups on the both terminal groups. As the mole ratio is low and becomes closer to 1.0, the molecular weight of an urethan prepolymer to be generated excessively increases, so that the viscosity excessively increases. Additionally, a urethane prepolymer having single terminal isocyanate or a urethane prepolymer in which the terminals are OH groups is likely to be generated. On the other hand, when the mole ratio becomes too high, the molecular weight of a urethane prepolymer to be generated becomes extremely small, and the compatibility with matrix resins becomes great, and thus a phase separation structure becomes ambiguous, and a reforming effect may not be sufficiently exhibited, which is not preferred.

As described above, when the mole ratio of the NCO groups is set to be further excessive, a urethane prepolymer in which both terminals are further modified is generated, whereby the urethane prepolymer (P2) in which the epoxy resin with n≥1 has been further added to both terminals can be obtained. Therefore, this urethane prepolymer (P2) is likely to be reliably introduced into a crosslinking portion during the curing of the epoxy resin, and thus it is considered that toughness is improved with a small amount of the urethane prepolymer (P2).

The polyurethane-modified epoxy resin used in the present invention can be obtained by preparing urethane prepolymer (P) in the presence of epoxy resin (a), and then conducting a polyurethanization reaction by using low molecular weight polyol compound (d) such that the mole ratio (P):(d) between the NCO groups in urethane prepolymer (P) and the OH groups in low molecular weight polyol compound (d) falls within a range of 0.9:1 to 1:0.9.

Low molecular weight polyol compound (d) is preferably used in an amount in which the moles of NCO groups at the terminals of urethane prepolymer (P) be almost equal to moles of OH groups in low molecular weight polyol compound (d). That is, since polyol compound (b), polycarbonate diol compound (b-2) and low molecular weight polyol compound (d) have OH groups, and polyisocyanate compound (c) has NCO groups, the number of moles (B) of the OH groups in (b)+(b-2)+(d) is preferably set to be almost equal to the number of moles (C) of the NCO groups in (c). The ratio is preferably within a range of 0.9:1 to 1:0.9. As the ratio between the number of moles of the OH groups and the number of moles of the NCO groups becomes closer to 1, the molecular weight of polyurethane to be generated increases.

A method for producing the polyurethane-modified epoxy resin used in the present invention is described as follows. For example, 50 to 80% by weight of epoxy resin (a) relative to the total amount of polyol compound (b), polycarbonate diol compound (b-2), polyisocyanate compound (c) and low molecular weight polyol compound (d), and 20 to 55% by weight of polycarbonate diol (b-2) relative to the total amount of component (b) and component (b-2) are used to conduct a reaction in the presence of epoxy resin (a) (reaction 1). Reaction 1 provides a urethane prepolymer (P1) through a preferential reaction proceeded among polyol compound (b), polycarbonate diol compound (b-2) and polyisocyanate compound (c), and subsequently a urethane prepolymer (P2) in which both terminals are mainly epoxidized is generated through a reaction proceeded between some of the urethane prepolymer (P1) and epoxy resin (a), to preferably provide a mixture containing a slight amount of the generated urethane prepolymer (P2) in which a single terminal is epoxidized, and urethane prepolymer (P1) in which both terminals are remained as NCO.

For the reaction between the urethane prepolymer (P1) and epoxy resin (a), it is preferred to set the reaction temperature within a range of 80° C. to 150° C. and the reaction time within a range of one to five hours in order to conduct a reaction between the poorly reactive secondary OH groups in the n 1 structure in epoxy resin (a) with NCO groups due to a necessity to form an urethan bond.

Subsequently, low molecular weight polyol compound (d) is added such that the mole ratio (P):(d) between the NCO groups in urethane prepolymer (P) and the OH groups in low molecular weight polyol compound (d) falls within a range of 0.9:1 to 1:0.9 to conduct a polyurethanization reaction (reaction 2). Incidentally, OH groups in the epoxy group of the n=0 structure in the epoxy resin and polyol compound (d) are alcoholic OH groups and thus do not react.

In reaction 2, it is preferred to set the reaction temperature within a range of 80° C. to 150° C. and set the reaction time within a range of one to five hours, but this reaction may be performed under milder conditions than in reaction 1 since this reaction is conducted between the NCO groups and the OH groups contained in low molecular weight polyol compound (d).

In the process of the above-described reactions (reactions 1 and 2), a catalyst can be used as necessary. This catalyst is used to sufficiently complete the generation of the urethan bond, and examples thereof include amine compounds such as ethylenediamine, tin-based compounds, zinc-based compounds and the like.

In reaction 2, the urethane prepolymer (P1) in which both terminals or a single terminal is NCO, which is present in a small amount, reacts with low molecular weight polyol compound (d) such that the chain length is extended to form a polyurethane, and the urethane prepolymer (P2) in which both terminals are adducts of the n 1 structure in epoxy resin (a) remains unreacted.

That is, the polyurethane-modified epoxy resin used in the present invention is a mixture of, mainly, a resin component in which the n 1 structure in epoxy resin (a) has been added to both terminals of urethane prepolymer (P), and as a small-amount or minute-amount component, a resin component in which the n 1 structure in epoxy resin (a) has been added to one single terminal of urethane prepolymer (P) and the other single terminal is an NCO group, a resin component in which both terminals of urethane prepolymer (P) are NCO groups and the n=0 structure component in epoxy resin (a), and the epoxy equivalent is preferably within a range of 180 to 1000 g/eq, and the viscosity at 120° C. is preferably within a range of 0.1 to 20 Pas.

Hereinafter, reaction formulae to obtain polyurethane-modified epoxy resin (A) which is used in the composition of the present invention is shown below.

The following formula 19 schematically describes a urethane pre-polymerizing step regarding reaction 1. Urethane prepolymer (P) is generated by conducting a reaction among bisphenol-type epoxy resin (a) mainly composed of the n=0 structure and the n=1 structure, medium and high molecular weight polyol compound (b) and polyisocyanate compound (c). The generated urethane prepolymer (P) includes three types of prepolymers: aa urethane prepolymer (U) in which both terminals are NCO groups, a urethane prepolymer (T) in which one terminal is a NCO group and the other terminal is a group to which an epoxy resin having an n=1 structure containing a secondary hydroxyl group is added, and a urethane prepolymer (S) in which both terminals are groups to which an epoxy resin having n=1 structure containing a secondary hydroxyl group is added. Specifically, it is considered that the urethane prepolymer (S) in which both terminals are groups to which an epoxy resin having an n=1 structure containing a secondary hydroxyl group is added is a main product, and urethane prepolymer (T) in which one terminal is a NCO group and the other terminal is a group to which an epoxy resin having an n=1 structure containing a secondary hydroxyl group is added and the urethane prepolymer (U) in which both terminals are NCO groups are generated in an extremely small amount, since polyisocyanate compound (c) and bisphenol-type epoxy resin (a) are significantly excessively used. Incidentally, an epoxy resin having an n=0 structure having no secondary hydroxyl groups among epoxy resin (a) is not involved in this reaction.

[Chem. 18]

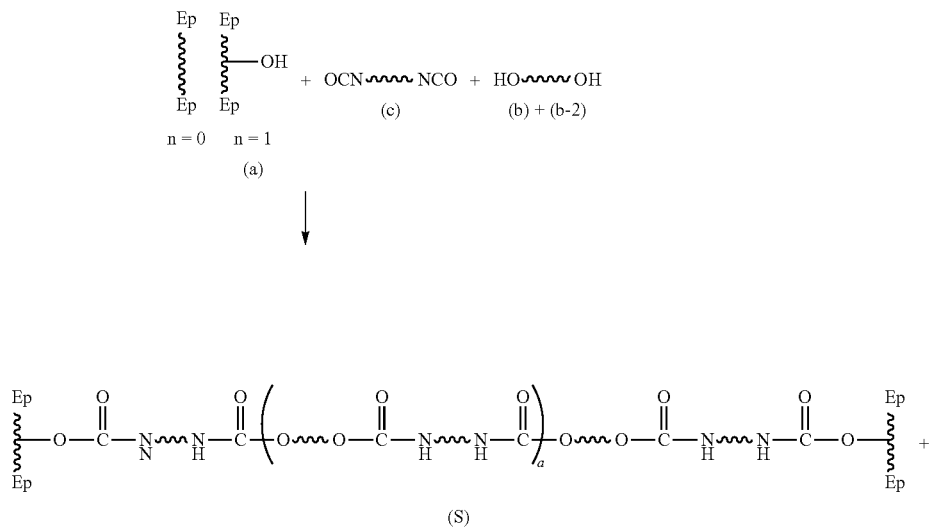

-continued

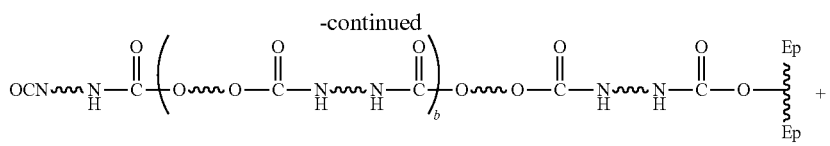
(T)

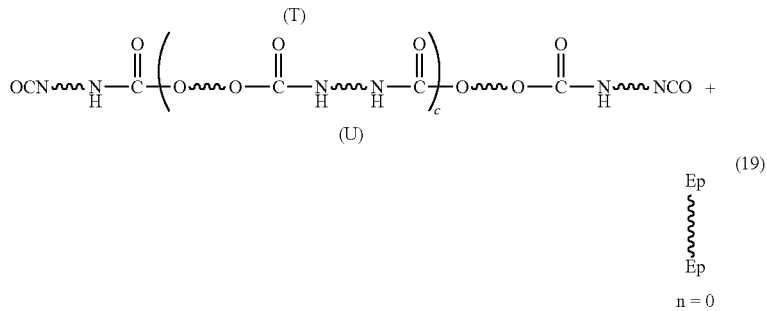
(U)

(19)

The following formula 20 schematically describes a urethane polymerizing step (polyurethane step) regarding reaction 2. A reaction conducted by adding low molecular weight polyol (d) to a mixture generated in reaction 1, which contains urethane prepolymer (U) in which both terminals are NCO groups, urethane prepolymer (T) in which one terminal is a NCO group and the other terminal is a group to which an epoxy resin having an n=1 structure is added, urethane prepolymer (S) in which both terminals are groups to which an epoxy resin having an n=1 structure, and an epoxy resin having an n=0 structure that is free from secondary hydroxyl groups and thus has not been involved in the reaction, provides (V) and (W) in a minute amount by a reaction between (T) that has been generated in a small amount and component (U) that has been generated in an extremely small amount, while (S) which is uninvolved in the reaction remains as it is which is referred as (A), therefore, as a whole, it is considered that the low molecular weight polyurethane (A) in which an epoxy resin has been added to both terminals is mainly generated.

Almost all of the polyurethane generated is a mixture containing low molecular weight polyurethane (A) in which an epoxy resin having an n=1 structure has been added to both terminals which is as same as the urethane prepolymer (S) in which an epoxy resin having an n=1 structure has been added to both terminals by the above-described manner, and an epoxy resin having n=0 form, and therefore it is considered that almost all of the urethane which is modified with an epoxy resin are generated.

[Chem. 19]

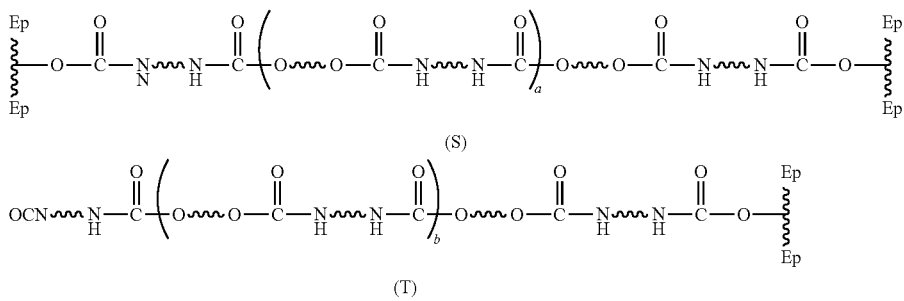
(S)

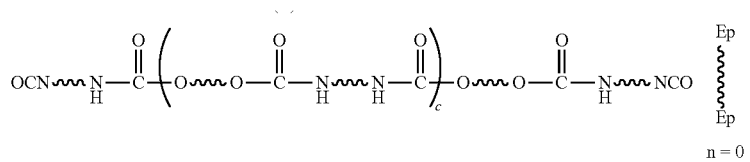
(T)

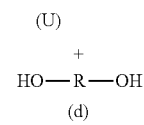
(U)

+

HO—R—OH
(d)

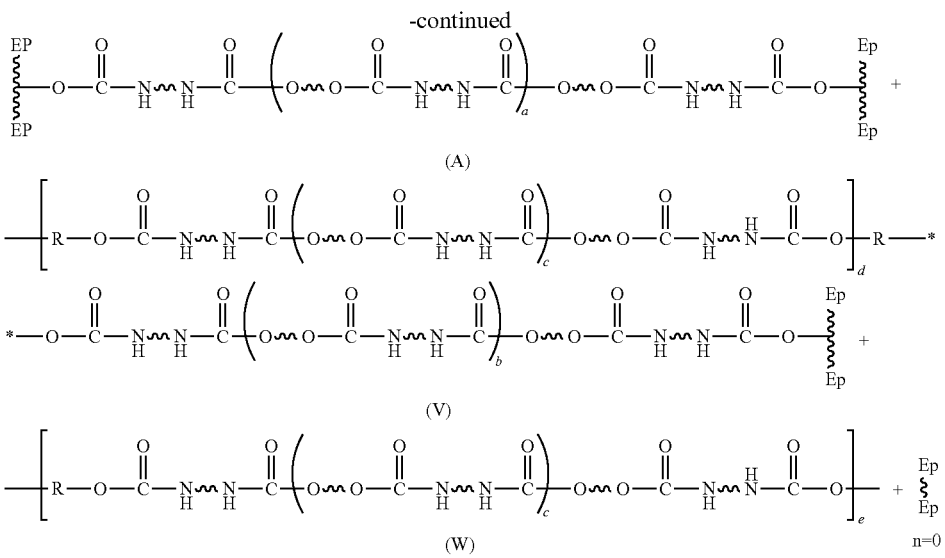

The epoxy resin composition of the present invention can be obtained by blending a non-polyurethane-modified liquid epoxy resin (B) as an adjuster of polyurethane concentration, a bisphenol-type solid epoxy resin (C) having a glass transition temperature or melting point of 50° C. or higher as an adjusting material of compatibility or viscosity and an improver of tackiness in a resin sheet or prepreg state and an amine-based curing agent (D) with the above-described polyurethane-modified epoxy resin (A).

In order to finely adjust the viscosity or Tg, a different epoxy resin (component E), a curing accelerator (F) and, furthermore, an inorganic filler such as calcium carbonate, talc or titanium dioxide as an extending material or a reinforcing material may be blended as necessary in the resin composition of the present invention.

Liquid epoxy resin (B) is not particularly limited as long as the epoxy resin is not polyurethane-modified and is liquid at 30° C., but is preferably a bisphenol A-type epoxy resin or a bisphenol F-type epoxy resin from the viewpoint of availability and a favorable balance between price and characteristics.

The polyurethane concentration in the epoxy resin composition can be increased or decreased by increasing or decreasing the amount of liquid epoxy resin (B) blended. Here, the polyurethane concentration is calculated from the following equation.

Polyurethane concentration=$\{(b)+(b-2)+(c)+(d)\} \times 100/\{(a)+(b)+(b-2)+(c)+(d)+(B)+(C)+(D)\}$ wherein (a) to (d), (B), (C) and (D) each indicate the weight of each corresponding essential component used. In a case where other components, for example, the different epoxy resin (E), the curing accelerator (F) or the like, are blended in addition to the essential components, these other components are added to the denominator.

When the polyurethane concentration in a cured product increases, cured product characteristics such as bending strain or impact strength and glass transition temperature change. When the polyurethane concentration increases, generally, bending strain and impact strength of the cured product tends to increase.

In a case where a liquid bisphenol A-type epoxy resin is used as liquid epoxy resin (B), the polyurethane modification rate in the cured product (=polyurethane concentration) is preferably set within a range of 7 to 15 wt %, which enables Izod impact value (unnotched) of the cured product to reach 30 kJ/m² or more and the glass transition temperature of the cured product to reach 110° C. or higher so as to exhibit excellent impact characteristics.

The epoxy resin composition of the present invention contains a bisphenol-type solid epoxy resin (C) having a glass transition temperature or melting point of 50° C. or higher.

Any solid epoxy resins can be used as such a solid epoxy resin (C) as long as the glass transition temperature or melting point is 50° C. or higher. For example, high molecular weight-type bisphenol-type epoxy resins are useful and, additionally, a solid bisphenol F-type epoxy resin, a bisphenol-type epoxy resin, a dicyclopentadiene-type epoxy resin, furthermore, modified epoxy resins thereof and the like or a phenoxy resin can be exemplified. When solid epoxy resin (C) is used to adjust the viscosity or increase the Tg of the resin composition, the content of solid epoxy resin (C) is preferably set to 0.1 to 50% by weight relative to the weight of the entire composition.

The epoxy resin composition of the present invention preferably contains 20.0 to 50.0% by weight of component (A), 10 to 40% by weight of component (B) and 0.1 to 50.0% by weight of component (C) relative to the total of components (A) to (D).

When the content of component (A) is less than 20.0% by weight, a sea-island structure is not uniformly formed, and a sufficient impact strength cannot be obtained. In addition, when the content exceeds 50.0% by weight, a structure in which a phase separation state and a sea-island structure have mutually intruded is formed, a sufficient impact strength may not be obtained also in this case. Component (C) is designed for appropriate viscosity adjustment in order to suppress a resin flow at the time of molding while maintaining the impregnating ability or fluidity of the resin. When the content of component (C) exceeds 50.0% by weight, the viscosity increases excessively, and thus a handling difficulty may arise.

The epoxy resin composition of the present invention preferably has an initial viscosity of 100 to 2000 Pa·s. The initial viscosity is more preferably 1100 to 1500 Pa·s.

As the curing agent (D), dicyandiamide (DICY) or a derivative thereof is used since they are available and enable to provide one liquid type composition excellent in storage stability.

Regarding the amount of the curing agent (D) blended, in a case where the curing agent is DICY, the ratio between the number of moles of epoxy groups in the entire epoxy resin containing the polyurethane-modified epoxy resin and non-polyurethane-modified epoxy resin (B) and the number of moles of active hydroxyl groups in DICY is preferably set within a range of 1:0.3 to 1:1.2, preferably to 1:0.9 to 1:1.1, from the viewpoint of the characteristics of the cured product.

In the epoxy resin composition of the present invention, a polyfunctional (tri- or higher-functional) epoxy resin can be used as the other epoxy resin (E) in order to finely adjust the viscosity or to increase Tg. The use of the polyfunctional epoxy resin increases the crosslinking density, changes the phase separation state or removes fracture toughness, and thus the content thereof is preferably set to 0.1 to 10% by weight relative to the weight of the entire composition. Examples of the polyfunctional (tri- or higher-functional) epoxy resin include a phenol novolac-type epoxy resin, a cresol novolac-type epoxy resin, a glycidylamine-type epoxy resin such as tetraglycidyl diaminodiphenylmethane, a glycidylphenyl ether-type epoxy resin such as tetrakis (glycidyloxyphenyl)ethane or tris(glycidyloxyphenyl)methane and a glycidylamine-type and glycidylphenyl ether-type epoxy resin such as triglycidylaminophenol. Furthermore, examples thereof include epoxy resins obtained by modifying these epoxy resins, brominated epoxy resins obtained by brominating these epoxy resins and the like.

The epoxy resin composition of the present invention may further contain a curing accelerator (F). As the curing accelerator (F), a crystalline imidazole compound such as 2,4-diamino-6-[2'-methylimidazolyl-(1')]-ethyl-s-triazine isocyanuric acid addition salt (2MA-OK) or a urea compound such as 3-(3,4-dichlorophenyl)-1,1-dimethylurea (DCMU) may be used. The amount of the curing accelerator (F) to be blended is preferably within a range of 0.1 to 5 wt % relative to the total of all epoxy resins including the polyurethane-modified epoxy resin and the non-polyurethane-modified liquid epoxy resin (B) and the curing agent (D).

The epoxy resin composition of the present invention does not impair workability such as tackiness, followability to adhesion surfaces, castability to molds and impregnating ability into carbon fibers, glass fibers and woven fabrics thereof.

A cured product of the epoxy resin composition of the present invention can be obtained by casting the epoxy resin composition in a mold, applying and attaching the epoxy resin composition to an adherend as an adhesive, or applying the epoxy resin composition as paint or impregnating a carbon fiber or a glass fiber and a fabric thereof with the epoxy resin composition, followed by heating the epoxy resin composition to a temperature of 80° C. to 200° C. and holding the epoxy resin composition for several hours.

The cured product of the epoxy resin composition of the present invention can be made to have an Izod impact value (unnotched) of 30 kJ/m$^2$ or more and, furthermore, have a glass transition temperature of 110° C. or higher, an elastic modulus of 2.5 GPa or more and a fracture toughness of 2.0 MPa·m$^{0.5}$ or more.

EXAMPLES

Next, the present invention will be specifically described based on Examples. The present invention is not limited to these specific examples and can be modified or changed to any forms within the scope of the subject matter of the present invention.

Methods for evaluating characteristics described in the Examples are as described below.

(1) Determination of presence or absence of residual NCO group using IR: The obtained polyurethane-modified epoxy resin (0.05 g) was dissolved in tetrahydrofuran (10 ml), then, spread on a KBr plate using the flat plate portion of a micro spatula, dried at room temperature for 15 minutes to evaporate tetrahydrofuran, thereby preparing a specimen for IR measurement. This was set in an FT-IR device Spectrum-One manufactured by PerkinElmer Co., Ltd., and, in a case where the stretching vibration absorption spectrum at 2270 cm$^{-1}$ which corresponds to the characteristic absorption band of the NCO group was vanished, a residual NCO group was determined to be absent.

(2) Epoxy equivalent: Quantified according to JIS K 7236.

(3) Hydroxyl equivalent: Dimethylformamide (25 ml) is fed into a 200 ml triangular flask with a glass stopper, and a specimen containing 11 mg/equivalent or less of a hydroxyl group is precisely weighed, added and dissolved. A 1 mol/L-phenyl isocyanate toluene solution (20 ml) and a dibutyltin maleate catalyst solution (1 ml) are added with pipettes, respectively, well shaken to be mixed, tightly stoppered and reacted for 30 to 60 minutes. After the end of the reaction, a 2 mol/L-dibutylamine toluene solution (20 ml) was added, well shaken to be mixed, left to stand for 15 minutes and reacted with excess phenyl isocyanate. Next, methylcellosolve (30 ml) and a bromocresol green indicator (0.5 ml) were added, and excess amine is titrated with a calibrated methyl cellosolve perchlorate solution. Since the indicator changes from blue to green and, to yellow, the initial point when the indicator becomes yellow is defined as an end point, and the hydroxyl equivalent was obtained using the following equation i and equation ii.

$$\text{Hydroxyl equivalent}(g/eq)=(1000\times W)/C(S-B) \quad \text{(i)}$$

C: Concentration of methyl cellosolve perchlorate solution (mol/L)
W: Amount of specimen (g)
S: Amount of methyl cellosolve perchlorate solution titrated (ml)
B: Amount of methyl cellosolve perchlorate solution titrated required for blank test in titration (ml)

$$C=(1000\times w)/\{121\times(s-b)\} \quad \text{(ii)}$$

w: Amount of tris-(hydroxymethyl)-aminomethane weighed for calibration (g)
s: Amount of methyl cellosolve perchlorate solution required for titration of tris-(hydroxymethyl)-aminomethane (ml)
b: Amount of methyl cellosolve perchlorate solution titrated required for blank test in calibration (ml)

(4) Viscosity: The viscosity of the resin composition before curing at 40° C. was measured with an E-type viscometer.

(5) Glass transition temperature (Tg): The glass transition temperature (Tg) of a test piece of the cured product was derived from the peak temperature of a tan δ curve using a dynamic viscoelasticity measuring instrument under a condition of a temperature increasing rate of 2° C./minute.

(6) Bending test: The cured product molded into the shape of JIS K 6911 by mold casting was used as a test piece, a bending test was performed using a universal test under conditions of room temperature of 23° C. and a crosshead speed of 1 mm/minute, and the bending strength, the bending strain and the bending elastic modulus were each measured.

(7) Izod impact strength: Measured in an unnotched state according to the Izod testing method of JIS K 7110 at room temperature of 23° C.

(8) Tackiness: The resin composition before curing was melted at 60° C. to 80° C. and applied onto a base material such as release paper with a bar coater in a thickness of 100 g/m², a 40 μm-thick polyethylene film was attached thereto as a cover material, and whether or not the polyethylene film could be peeled off without resin residue at 25° C. was determined. In a case where the polyethylene film was peeled off with no problems, the tackiness was evaluated as "0", and, in a case where a resin residue was observed on the peeled-off surface, the tackiness was evaluated as "X".

(9) Fracture toughness: The cured product molded into the shape of JIS K 6911 by mold casting was used as a test piece, and a test was performed using a universal test under conditions of room temperature of 23° C. and a crosshead speed of 0.5 mm/minute. Before the test, a notch (nick) was made on the test piece by placing a razor blade on the test piece and imparting an impact to the razor blade with a hammer.

Raw materials used are as described below. The units of equivalents are "g/eq".

Epoxy resin (a): EPOTOHTO YDF-170 manufactured by Nippon Steel Chemical & Material Co., Ltd., bisphenol F-type epoxy resin, epoxy equivalent=170, hydroxyl equivalent=2489

Polyol (b): ADEKA POLYETHER P-2000 manufactured by ADEKA Corporation, polypropylene glycol, number-average molecular weight: 2000, hydroxyl equivalent: 1020

Polycarbonate diol compound (b-2): DURANOL T5652 manufactured by Asahi Kasei Corporation, polycarbonate diol, number-average molecular weight: 2000, hydroxyl equivalent: 991

Polyisocyanate (c): COSMONATE PH manufactured by Mitsui Fine Chemicals, Inc Co., Ltd., 4,4'-diphenyl-methane-diisocyanate Low molecular weight polyol (d): 1,4-Butanediol (reagent)

Liquid epoxy resin (B): EPOTOHTO YD-128 manufactured by Nippon Steel Chemical & Material Co., Ltd., bisphenol A-type epoxy resin, epoxy equivalent=187

Solid epoxy resin (C):

(C-1) Bisphenol A-type difunctional solid epoxy resin (YD-014, manufactured by Nippon Steel Chemical & Material Co., Ltd., solid at normal temperature)

(C-2) Bisphenol A-type difunctional solid epoxy resin (YD-019, manufactured by Nippon Steel Chemical & Material Co., Ltd., solid at normal temperature)

Different epoxy resin (E): Phenol novolac-type difunctional solid epoxy resin (KDPN-1020, manufactured by Nippon Steel Chemical & Material Co., Ltd., liquid at normal temperature)

Curing agent (D): DICYANEX1400F manufactured by Evonik Industries AG, dicyandiamide Curing accelerator (F): CUREZOL 2MA-OK (manufactured by Shikoku Chemicals Corporation)

Synthesis Example 1

"EPOTOHTO YDF-170" as epoxy resin (a), "ADEKA POLYETHER P-2000" as the polyol (b), "DURANOL T5652" as polycarbonate diol compound (b-2), "COS-MONATE PH" as the polyisocyanate (c) and 1,4-butanediol as the low molecular weight polyol (d) were used. The amounts of these used are shown in Table 1.

EPOTOHTO YDF-170, ADEKA POLYETHER P-2000 and DURANOL T5652 were charged into a 1000 ml four-neck separable flask including a nitrogen introduction pipe, a stirrer and a temperature controller and stirred and mixed at room temperature for 15 minutes. Next, COSMONATE PH was added thereto and reacted therewith at 120° C. for two hours (reaction 1: urethane pre-polymerizing step, this reaction product will be referred to as the primary reactant).

Subsequently, 1,4-butanediol was added thereto and reacted therewith at 120° C. for two hours (reaction 2: polyurethane step), thereby obtaining a polyurethane-modified bisphenol F-type epoxy resin (resin 1). Here, epoxy resin (a) was charged such that the content thereof reached 72% by weight relative to 100% by weight of the product of the reaction 2. In addition, the mole ratio ((b)+(b-2):(c)) between OH groups and NCO groups was set to 1:2.4, and the ratio between NCO groups in the primary reactant and OH groups in (d) was set to one. The completion of the reaction was confirmed from the fact that the absorption spectrum of the NCO groups was vanished using IR measurement.

Synthesis Examples 2 to 10

Reactions were performed in the same order as in Synthesis Example 1 except that the raw material feed compositions were set as shown in Tables 1 to 2, thereby obtaining polyurethane-modified bisphenol F-type epoxy resins (resins 2 to 10; the resin numbers correspond to the synthesis example numbers).

The mole ratios between NCO groups in the primary reactant and OH groups in (d) were all set to one. The completion of the reaction was confirmed from the fact that the absorption spectrum of the NCO groups was vanished using IR measurement.

In Tables 1 and 2, the amounts blended are expressed in "grams", and the values in 0 indicate % by weight. "(a) Concentration (wt %)" indicates the concentration of epoxy resin (a) in each resin, and "(b) OH group:(c) NCO group (mole ratio)" indicates the mole ratio between OH groups in (b) and NCO groups in (c).

TABLE 1

| | Synthesis Example | | | | |
|---|---|---|---|---|---|
| | 1 | 2 | 3 | 4 | 5 |
| (a) g | 700 | 700 | 700 | 700 | 540 |
| (wt. %) | (72.0) | (69.9) | (70.8) | (71.4) | (54.7) |
| (b) g | 157 | 186 | 157 | 110 | 280 |
| (wt. %) | (16.2) | (18.6) | (15.9) | (11.2) | (28.3) |
| (b-2) g | 50 | 46.8 | 75 | 106 | 89 |
| (wt. %) | (5.1) | (4.7) | (7.6) | (10.8) | (9.0) |
| (c) g | 61.8 | 65.1 | 57.2 | 62.3 | 75.7 |
| (wt. %) | (6.4) | (6.5) | (5.8) | (6.4) | (7.7) |
| (d) g | 2.9 | 2.9 | 0 | 2.5 | 3 |
| (wt. %) | (0.3) | (0.3) | (0.0) | (0.3) | (0.3) |
| Total g | 972 | 1000.8 | 989.2 | 980.8 | 987.7 |
| (wt. %) | (100.0) | (100.0) | (100.0) | (100.0) | (100.0) |
| Urethane modification rate % | 28% | 30% | 29% | 29% | 45% |
| (b-2)/[(b) + (b-2)] (wt. %) | 25% | 21% | 33% | 50% | 25% |

TABLE 1-continued

|  | Synthesis Example | | | | |
| --- | --- | --- | --- | --- | --- |
|  | 1 | 2 | 3 | 4 | 5 |
| NCO in (c): OH in (b) | 3.2 | 2.9 | 3.0 | 4.6 | 2.2 |
| NCO in (c): OH in (b) + (b-2) | 2.4 | 2.3 | 2.0 | 2.3 | 1.7 |
| Molecular weight (Mw) | 19000 | 18600 | 19400 | 19000 | 33000 |

TABLE 2

|  | Synthesis Example | | | | |
| --- | --- | --- | --- | --- | --- |
|  | 6 | 7 | 8 | 9 | 10 |
| (a) g | 700 | 860 | 860 | 860 | 600 |
| (wt. %) | (72.0) | (86.8) | (84.8) | (86.7) | (60.0) |
| (b) g | 208 | 36.5 | 73 | 73 | 253 |
| (wt. %) | (21.4) | (3.7) | (7.2) | (7.4) | (25.3) |
| (b-2) g | 0 | 35.2 | 23.3 | 0 | 0 |
| (wt. %) | (0.0) | (3.5) | (2.3) | (0.0) | (0.0) |
| (c) g | 61.8 | 55.1 | 55.1 | 55.1 | 124 |
| (wt. %) | (6.4) | (5.6) | (5.4) | (5.6) | (12.4) |
| (d) g | 2.9 | 4.1 | 2.9 | 4.1 | 23 |
| (wt. %) | (0.3) | (0.4) | (0.3) | (0.4) | (2.3) |
| Total g | 972.7 | 990.9 | 1014.3 | 992.2 | 1000 |
| (wt. %) | (100.0) | (100.0) | (100.0) | (100.0) | (100.0) |
| Urethane modification rate % | 28% | 13% | 15% | 13% | 40% |
| (b-2)/[(b) + (b-2)] (wt. %) | 0% | 50% | 25% | 0% | 0% |
| NCO in (c): OH in (b) | 2.4 | 12.3 | 6.2 | 6.2 | 4.0 |
| NCO in (c): OH in (b) + (b-2) | 2.4 | 6.2 | 4.6 | 6.2 | 4.0 |
| Molecular weight (Mw) | 18400 | 9200 | 8000 | 8400 | 22000 |

Next, Examples of epoxy resin compositions and epoxy resin cured products for which the polyurethane-modified epoxy resins (resins 1 to 10) obtained in Synthesis Examples 1 to 10 were used will be described. Also, the results thereof are summarized in Tables 3 and 4.

Example 1

The polyurethane-modified bisphenol F-type epoxy resin (resin 1) obtained in Synthesis Example 1 as polyurethane-modified epoxy resin (A), EPOTOHTO YD-128 as the non-polyurethane-modified liquid epoxy resin (B), YD-014 (C-1) or YD-019 (C-2) as the bisphenol-type solid epoxy resin (C), KDPN-1020 as the different epoxy resin (E), dicyandiamide as the curing agent (D) and 2MA-OK as the curing accelerator (F) were each charged into a 300 ml exclusive disposable cup in the formulation shown in Table 3, stirred and mixed under vacuum defoaming for 20 minutes using a vacuum planetary mixer for rotation and revolution laboratory, thereby obtaining a liquid resin composition. Here, the mole ratio between epoxy groups and dicyandiamide was set to 1:0.5, and a polyurethane-modified bisphenol F-type epoxy resin composition (140 g) in which the polyurethane concentration in a cured product reached 11.1% by weight was prepared.

Next, this liquid resin composition was cast in a mold having a groove shape with dimensions of a test piece for the Izod impact test of JIB K 7110. The dimensions of a test piece for a bending test and a test piece for a fracture toughness test were 100 mmL×10 mmW×4 mmt, and, regarding the dimensions of a test piece for a DMA test, the liquid resin composition was injected into a 100 mmL×10 mmW×1 mmt mold or silicon frame, and a test piece was cut to sizes suitable for measurement and used. The castability at this time was favorable enough to perform casting sufficiently. Next, the mold used to cast the resin was put into a hot air oven, and the resin was heated and cured at 130° C. for 50 minutes and, furthermore, at 150° C. for 50 minutes, thereby preparing an epoxy resin cured product test piece. Test results for which this test piece was used are shown in Table 3.

Examples 2 to 7 and Comparative Examples 1 to 5

Polyurethane-modified bisphenol F-type epoxy resin compositions having different polyurethane concentrations in the cured product were prepared in the same order as in Example 1 except that polyurethane-modified epoxy resin (A), the unmodified liquid epoxy resin (B), the unmodified solid epoxy resins (C-1) and (C-2), the different epoxy resins (E), the curing agent (D) and the curing accelerator (F) were blended in formulations shown in Tables 3 and 4.

Next, the liquid resin compositions were cast in molds and thermally cured in the same order as in Example 1, thereby preparing test pieces for characteristic evaluation. The physical properties and test results of the obtained compositions are shown in Tables 3 and 4.

In Tables 3 and 4, the amounts blended are expressed in grams (g). Regarding the comprehensive determination, "○" indicates "good", and "X" indicates "poor".

TABLE 3

|  | Example | | | | | | |
| --- | --- | --- | --- | --- | --- | --- | --- |
|  | 1 | 2 | 3 | 4 | 5 | 6 | 7 |
| (A) | Resin 1 | Resin 2 | Resin 3 | Resin 4 | Resin 1 | Resin 1 | Resin 5 |
|  | 42.0 | 43.0 | 42.2 | 42.0 | 35.0 | 48.0 | 25.0 |
| (B) | 12.0 | 11.0 | 17.8 | 12.0 | 19.0 | 12.0 | 35.0 |
| (C-1) | 35.0 | 35.0 | 25.0 | 35.0 | 35.0 | 24.0 | 25.0 |
| (C-2) | 6.0 | 6.0 | 10.0 | 6.0 | 6.0 | 9.0 | 6.0 |
| (E) | 5.0 | 5.0 | 5.0 | 5.0 | 5.0 | 5.0 | 5.0 |
| (D) | 3.3 | 3.2 | 3.6 | 3.3 | 3.4 | 3.6 | 3.5 |
| (F) | 2.5 | 2.4 | 2.7 | 2.5 | 2.5 | 2.7 | 2.6 |
| Total weight g | 105.8 | 105.7 | 106.3 | 105.7 | 105.9 | 104.2 | 102.1 |
| (A)/[(A)~(D)] (wt. %) | 42.7 | 43.8 | 42.8 | 42.7 | 35.6 | 49.7 | 26.5 |
| (C)/[(A)~(D)] (wt. %) | 41.7 | 41.7 | 35.5 | 41.7 | 41.7 | 34.2 | 32.8 |

TABLE 3-continued

| | Example | | | | | | |
|---|---|---|---|---|---|---|---|
| | 1 | 2 | 3 | 4 | 5 | 6 | 7 |
| Polyurethane concentration (wt. %) | 11.1% | 12.2% | 11.6% | 11.4% | 9.2% | 12.9% | 11.1% |
| Tg (° C.) | 131 | 133 | 132 | 133 | 134 | 134 | 139 |
| Bending strength (MPa) | 110 | 106 | 107 | 110 | 119 | 108 | 111 |
| Bending strain (%) | >8 | >8 | >8 | >8 | >8 | >8 | >8 |
| Bending elastic modulus (GPa) | 2.8 | 2.5 | 2.8 | 2.9 | 2.7 | 2.6 | 2.7 |
| Fracture toughness (MPa · m$^{0.5}$) | 3.0 | 2.4 | 2.7 | 2.7 | 2.4 | 2.6 | 2.4 |
| Izod impact strength (kJ/m$^2$) | 41 | 40 | 43 | 40 | 34 | 47 | 36 |
| Comprehensive determination | ○ | ○ | ○ | ○ | ○ | ○ | ○ |

TABLE 4

| | Comparative Example | | | | |
|---|---|---|---|---|---|
| | 1 | 2 | 3 | 4 | 5 |
| (A) | Resin 6 | Resin 7 | Resin 8 | Resin 9 | Resin 10 |
| | 42.0 | 43.7 | 38.3 | 43.7 | 25.0 |
| (B) | 12.0 | 11.8 | 15.7 | 11.7 | 55.0 |
| (C-1) | 35.0 | 29.5 | 35.0 | 33.7 | |
| (C-2) | 6.0 | 10.0 | 6.0 | 6.0 | 20.0 |
| (E) | 5.0 | 5.0 | 5.0 | 5.0 | |
| (D) | 3.3 | 3.8 | 3.7 | 3.8 | 4.1 |
| (F) | 2.5 | 2.8 | 2.8 | 2.8 | 3.5 |
| Total weight g | 105.8 | 106.6 | 106.4 | 106.7 | 107.5 |
| (A)/[(A)~(D)] (wt. %) | 42.7 | 44.2 | 38.8 | 44.2 | 24.0 |
| (C)/[(A)~(D)] (wt. %) | 41.7 | 40.0 | 41.6 | 40.2 | 19.2 |
| Polyurethane concentration (wt. %) | 11.1% | 5.4% | 5.5% | 5.5% | 9.3% |
| Tg (° C.) | 132 | 134 | 136 | 135 | 142 |
| Bending strength (MPa) | 100 | 133 | 136 | 118 | 108 |
| Bending strain (%) | >8 | >8 | >8 | >8 | >8 |
| Bending elastic modulus (GPa) | 2.4 | 3.2 | 3.2 | 2.6 | 2.5 |
| Fracture toughness (MPa · m$^{0.5}$) | 2.4 | 1.4 | 1.5 | 1.7 | 2.4 |
| Izod impact strength (kJ/m$^2$) | 46 | 20.0 | 48.0 | 44.0 | 24 |
| Comprehensive determination | x | x | x | x | x |

In the compositions containing the urethane-modified epoxy resins of Examples 1 to 7, high heat resistance, high elasticity, high fracture toughness and high impact strength were all achieved in a good balance compared with those in Comparative Examples 1 to 5.

The invention claimed is:

1. An epoxy resin composition comprising the following components (A) to (D) as essential components:
   (A) a polyurethane-modified epoxy resin having a polycarbonate structure in a molecule and having a urethane modification rate of 20 to 60% by weight;
   (B) a non-polyurethane-modified epoxy resin that is liquid at 30° C.;
   (C) a bisphenol-type solid epoxy resin having a glass transition temperature or melting point of 50° C. or higher; and
   (D) an amine-based curing agent that is dicyandiamide or a derivative thereof,
   wherein 20.0 to 50.0% by weight of component (A), 0.1 to 50.0% by weight of component (B) and 0.1 to 50.0% by weight of component (C) are contained relative to a total of components (A) to (D).

2. The epoxy resin composition according to claim 1, wherein the polycarbonate structure of the polyurethane-modified epoxy resin (A) includes a structural unit represented by a general formula (1),

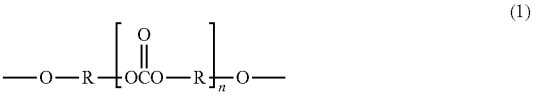

(1)

wherein each R is independently an alkylene group having 1 to 20 carbon atoms, and n is a number of 1 to 50.

3. The epoxy resin composition according to claim 2, wherein the polyurethane-modified epoxy resin (A) has a weight-average molecular weight (Mw) of 10,000 or more and 50,000 or less.

4. The epoxy resin composition according to claim 1, wherein the polyurethane-modified epoxy resin (A) has a weight-average molecular weight (Mw) of 10,000 or more and 50,000 or less.

5. The epoxy resin composition according to claim 1, wherein the polyurethane-modified epoxy resin (A) is prepared by:
   combining an epoxy resin (a), a polyol compound (b), a polycarbonate diol compound (b-2), and a polyisocyanate compound (c) to generate a urethane prepolymer (P); and
   adding a low molecular weight polyol compound (d) as a chain extender such that the mole ratio between an NCO group in the urethane prepolymer (P) and an OH group in the low molecular weight polyol compound (d) falls within a range of 0.9:1 to 1:0.9, to perform polyurethanization reaction;
   wherein:
   the epoxy resin (a) is a bisphenol-based epoxy resin represented by the following formula (2) and having an epoxy equivalent of 150 to 200 g/eq and a hydroxyl equivalent of 2000 to 3000 g/eq;
   the polyol compound (b) has a number-average molecular weight of 200 or more;
   the low molecular weight polyol compound (d) has a number-average molecular weight of less than 200;
   the epoxy resin (a) accounts for 50 to 80% by weight of total weight of (a), (b), (b-2), (c) and (d); and
   the polycarbonate diol (b-2) accounts for 20 to 55% by weight of total weight of (b) and (b-2):

(2)

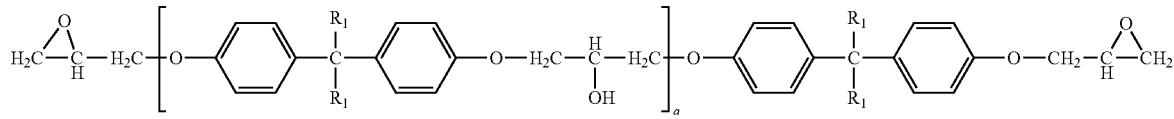

wherein each $R_1$ is independently H or an alkyl group, and a is a number of 0 to 10.

6. An epoxy resin cured product obtained by curing the epoxy resin composition according to claim 5.

7. A method for producing the epoxy resin composition according to claim 1 comprising:
preparing the polyurethane-modified epoxy resin (A); and
combining components (A), (B), (C), and (D) such that component (A) accounts for 20.0 to 50.0% by weight, component (B) accounts for 0.1 to 50.0% by weight, and component (C) accounts for 0.1 to 50.0% by weight, based on the total weight of components (A) to (D);
wherein the polyurethane-modified epoxy resin (A) is prepared by:
combining an epoxy resin (a), a polyol compound (b), a polycarbonate diol compound (b-2), and a polyisocyanate compound (c) to generate a urethane prepolymer (P); and
adding a low molecular weight polyol compound (d) as a chain extender such that the mole ratio between an NCO group in the urethane prepolymer (P) and a OH group in the low molecular weight polyol compound (d) falls within a range of 0.9:1 to 1:0.9, to perform polyurethanization reaction;
wherein:
the epoxy resin (a) is a bisphenol-based epoxy resin represented by the following formula (2) and having an epoxy equivalent of 150 to 200 g/eq and a hydroxyl equivalent of 2000 to 3000 g/eq;
the polyol compound (b) has a number-average molecular weight of 200 or more;
the low molecular weight polyol compound (d) has a number-average molecular weight of less than 200;
the epoxy resin (a) accounts for 50 to 80% by weight of total weight of (a), (b), (b-2), (c) and (d); and
the polycarbonate diol (b-2) accounts for 20 to 55% by weight of total weight of (b) and (b-2):

(2)

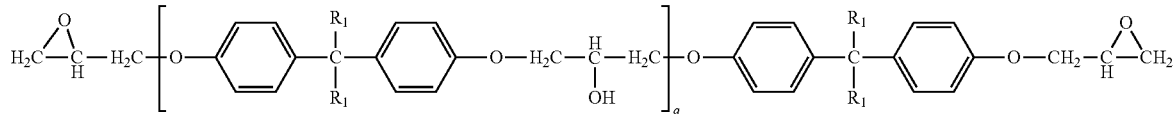

wherein each $R_1$ is independently H or an alkyl group, and a is a number of 0 to 10.

8. An epoxy resin cured product obtained by curing the epoxy resin composition according to claim 1.

9. The epoxy resin cured product according to claim 8 having: a glass transition temperature of 110° C. or higher, an Izod impact strength value (unnotched) according to JIS K 7110 of 30 kJ/m² or more, an elastic modulus of 2.5 GPa or more and a fracture toughness of 2.0 MPa·m$^{0.5}$ or more.

* * * * *